United States Patent
Yonezawa

(10) Patent No.: US 7,931,965 B2
(45) Date of Patent: Apr. 26, 2011

(54) COVER TAPE FOR ELECTRONIC COMPONENT PACKING BODY AND ELECTRONIC COMPONENT PACKING BODY

(75) Inventor: Takaki Yonezawa, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 0 days.

(21) Appl. No.: 12/675,971

(22) PCT Filed: Aug. 7, 2009

(86) PCT No.: PCT/JP2009/064006
§ 371 (c)(1),
(2), (4) Date: May 24, 2010

(87) PCT Pub. No.: WO2010/018791
PCT Pub. Date: Feb. 18, 2010

(65) Prior Publication Data
US 2010/0266826 A1    Oct. 21, 2010

(30) Foreign Application Priority Data

Aug. 12, 2008    (JP) ................................. 2008-207583

(51) Int. Cl.
*B32B 7/12*    (2006.01)
*B32B 5/16*    (2006.01)
(52) U.S. Cl. ........ 428/343; 428/323; 428/347; 428/346; 428/354
(58) Field of Classification Search .................. 428/343, 428/323, 347, 346, 354
See application file for complete search history.

(56) References Cited

U.S. PATENT DOCUMENTS

| | | | |
|---|---|---|---|
| 7,273,908 B2 * | 9/2007 | Ito et al. | 525/333.9 |
| 2002/0137973 A1 * | 9/2002 | Reeve et al. | 568/621 |
| 2006/0199005 A1 * | 9/2006 | Fuji et al. | 428/347 |

FOREIGN PATENT DOCUMENTS

JP        9-267450        10/1997

(Continued)

OTHER PUBLICATIONS

Plastic Material data sheets: Typical properties of ethylene copolymer, Division of Automation Creation, Inc, no month—2004.*

(Continued)

*Primary Examiner* — Callie E Shosho
*Assistant Examiner* — Samir Shah
(74) *Attorney, Agent, or Firm* — Ditthavong Mori & Steiner, P.C.

(57) ABSTRACT

A cover tape for packaging electronic components is formed that causes no contamination of sealing bar due to the outflow of the cushion layer, and attains superior adhesion to the carrier tape. Embodiments include a cover tape, for packaging electronic components heat-sealable to a carrier tape for packaging electronic components, comprising: at least a base layer, a cushion layer formed of resin A, a following layer formed along the heat-seal layer of resin B, and a heat-sealing layer laminated in this order; wherein resin A has a Vicat softening temperature Ta measured in accordance with ISO 306 (rate of temperature increase:50° C./hour, load: 10N), and resin B comprises a linear low density polyethylene and has a Vicat softening temperature Tb measured in accordance with ISO 306 (rate of temperature increase:50° C./hour, load: 10N) satisfying the Relational Expression 1 below; and the thickness of the following layer is not smaller than 2 μm and not larger than 15 μm:

Ta−Tb≧3(° C.).    Relational Expression 1

15 Claims, 3 Drawing Sheets

FOREIGN PATENT DOCUMENTS

| | | |
|---|---|---|
| JP | 2000-191991 | 7/2000 |
| JP | 2001-278333 | 10/2001 |
| JP | 2003-160167 | 6/2003 |
| JP | 2006-219137 | 8/2006 |
| JP | 2007-008502 | 1/2007 |

OTHER PUBLICATIONS

Plastic Material Data Sheets: Typical properties of polyethylene, Division of Automation Creation, Inc, no month—2004.*

* cited by examiner

COVER TAPE FOR ELECTRONIC COMPONENT PACKING BODY AND ELECTRONIC COMPONENT PACKING BODY

FIELD OF THE INVENTION

The present invention relates to a cover tape for packaging electronic components that can be heat-sealed to a carrier tape used for conveying electronic components and to an electronic component packing body.

BACKGROUND OF THE INVENTION

Conventionally, for storage and delivery of electronic components such as IC chips and surface mount components, a carrier tape has been widely used, in which pockets processed to have recesses conforming to the shape of electronic components are formed successively. Once the electronic components are housed in the recessed pockets of carrier tape, the recessed pockets are sealed using a heat-sealable cover tape, to prevent falling of electronic components during delivery and to protect the electronic components against foreign matter in the environment.

Recently, in order to improve productivity by making shorter the time for heat-sealing and to stabilize the state of heat-sealing, a cover tape has been desired that poses no problem in production even if heat-sealing temperature and heat-sealing pressure are set higher than conventionally used.

Further, the reduction in size of electronic components has made it necessary to form the pockets of the carrier tape smaller. To meet such demands, attempts have been made to improve processability and strength of the pockets mentioned above, by changing the material for carrier tape from conventionally used polystyrene-based material to engineering plastic materials such as polycarbonate-based resin having higher rigidity. The engineering plastic resin, however, has higher softening temperature than polystyrene and, therefore, heat-sealing temperature must be made higher than conventionally used, in order to attain sufficiently reliable adhesion between the carrier tape and the cover tape.

Considering the demand for improved productivity and the change of material for the cover tape as described above, proposals have been made to conduct heat-sealing of cover tape to carrier tape, which has been done at a heat-sealing temperature of 120 to 160° C., at a higher temperature of about 180 to 220° C.

It is noted that a cover tape having, between a base layer and a heat-sealing layer, a cushion layer formed of linear low density polyethylene, elastomer resin, ethylene vinyl acetate copolymer or other flexible resin has been widely used, to provide cushioning characteristic and to improve heat-sealing characteristic (see Patent Document 1).

While the heat-sealing temperature becomes higher as described above, if the cushion layer has low softening temperature, the cushion layer resin would flow out from a tape end during heat-sealing, possibly causing a problem of contamination of a sealing bar used for heat-sealing. In addition, if the cushion layer has low softening temperature, thickness of cushion layer resin decreases as the cushion layer resin flows out, causing a problem of degraded strength of the cover tape itself.

If a resin having high softening temperature is used in order to prevent the outflow of cushion layer resin, the cushion layer would not sufficiently be made soft even when heated for heat-sealing, so that the heat-sealing layer would not well follow any warp, deformation or roughness on the surface of the carrier tape, and as a result, sufficient adhesion between the heat-sealing layer and the carrier tape would not be attained, causing a problem of lower peeling strength (adhesion strength). In view of these problems, development of a cover tape that can suitably be used at a high heat-sealing temperature of 180 to 220° C. has been desired.

PRIOR ART DOCUMENT

Patent Document

Patent Document 1 Japanese Kokai Publication Hei9-267450

SUMMARY OF THE INVENTION

Problem to be Solved by the Invention

The present invention provides a cover tape for packaging electronic components that causes no contamination of sealing bar by the outflow of the cushion layer and attains superior adhesion characteristic with the carrier tape.

The present disclosure provides a cover tape for packaging electronic components heat-sealable to a carrier tape for packaging electronic components, comprising at least a base layer, a cushion layer formed of resin A, a heat-seal following layer formed of resin B and a heat-sealing layer laminated in this order; wherein Vicat softening temperature $T_a$ of said resin A measured in accordance with ISO 306 (rate of temperature increase: 50° C./hour, load: 10 N) and Vicat softening temperature $T_b$ of said resin B measured in accordance with ISO 306 (rate of temperature increase: 50° C./hour, load: 10 N) satisfy the Relational Expression 1 below; and thickness of said heat-seal following layer is not smaller than 2 μm and not larger than 15 μm:

$$T_a - T_b \geq 3 (°C.).$$  Relational Expression 1

The Vicat softening temperature $T_a$ and Vicat softening temperature $T_b$ may satisfy the Relational Expression 2 below:

$$T_a - T_b \geq 10 (°C.).$$  Relational Expression 2

The Vicat softening temperature $T_a$ may be not lower than 96° C. and not higher than 115° C.

The Vicat softening temperature $T_b$ may be not lower than 75° C. and not higher than 93° C.

The resin A may be linear a low density polyethylene, a hydrogenated styrene-based elastomer, an ethylene vinyl acetate copolymer, or a resin composition containing a mixture of two or more selected from this group.

The resin B may be a linear low density polyethylene, a hydrogenated styrene-based elastomer, an ethylene vinyl acetate copolymer, or a resin composition containing a mixture of two or more selected from this group.

The flexural modulus of each of the resin A and the resin B measured in accordance with ISO 178 may be not lower than 70 MPa and not higher than 250 MPa.

The thickness of the cushion layer may be not smaller than 15 μm and not larger than 35 μm.

The heat-seal following layer may be positioned next to the heat-sealing layer.

The heat-seal following layer may be positioned next to the cushion layer.

Both the resin A and the resin B may comprise an ethylene α-olefin copolymer.

The molecular weight distribution represented by weight average molecular weight/number average molecular weight of the resin A and the resin B may be not higher than 5.

The electronic component packing body in accordance with the present disclosure is obtained by heat-sealing the cover tape for packaging electronic components described above to a carrier tape for packaging electronic components.

In the electronic component packing body described above, peeling may occur between the heat-sealing layer and the heat-seal following layer at a heat-sealed region, when the cover tape is peeled off from the carrier tape.

EFFECTS OF THE INVENTION

According to the present disclosure, a cover tape for packaging electronic components that causes no contamination of sealing bar by the outflow of intermediate layer even when heat-sealing is done at a high temperature and that attains superior adhesion characteristic with the carrier tape can be provided.

DETAILED DESCRIPTION OF PREFERRED EMBODIMENTS

The best mode for carrying out the present invention will be described in the following with reference to the figures.

Figure 1:
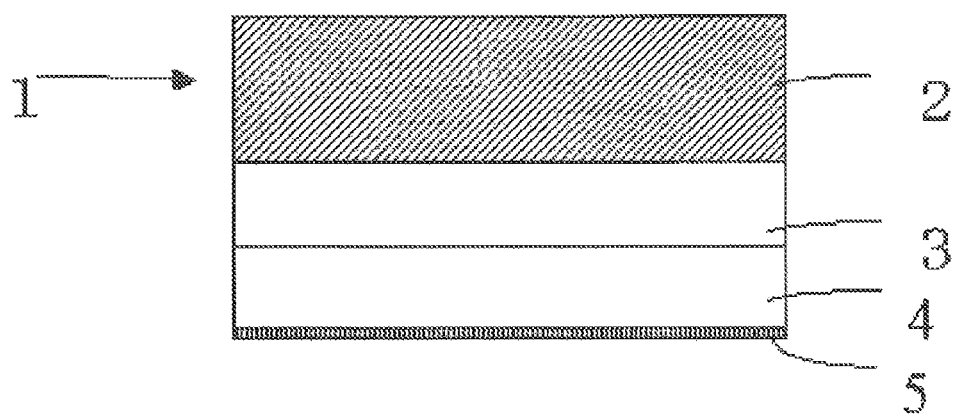
FIG. 1 is a schematic cross-section showing an example of a cover tape for packaging electronic components in accordance with the present disclosure.

The cover tape for packaging electronic components in accordance with the present disclosure is a cover tape used heat-sealed to a carrier tape for packaging electronic components. FIG. 1 is a schematic view showing an example of the cover tape in accordance with the present invention, and as shown in FIG. 1, the cover tape in accordance with the present invention includes at least a base layer 2, a cushion layer 3, a heat-seal following layer 4 and a heat-sealing layer 5, laminated in this order. Vicat softening temperature Ta measured in accordance with ISO 306 of the resin A forming the cushion layer 3 mentioned above and Vicat softening temperature Tb measured in accordance with ISO 306 of the resin B forming the heat-seal following layer 4 mentioned above satisfy the relation given by the Relational Expression 1 below, and the heat-seal following layer has a thickness of not smaller than 2 μm and not larger than 15 μm. If these characteristics are satisfied, adhesion to the carrier tape can be improved while contamination of heat-sealing bar caused by resin outflow is reduced, even when heat-sealing is done at a high temperature.

$$Ta-Tb \geq 3(° C.).$$  Relational Expression 1

Specifically, in the cover tape for packaging electronic components in accordance with the present disclosure, the cushion layer is formed of the resin A having higher Vicat softening temperature and, therefore, the resin outflow can be prevented even if heat-sealing is done at a temperature higher than conventionally used. Further, as the heat-seal following layer of the resin B having lower Vicat softening temperature is formed, it becomes possible to have the heat-sealing layer well follow the deformation of the carrier tape and to improve adhesion characteristics. Further, thickness of the heat-seal following layer is limited to at least 2 μm and at most 15 μm, that is, relatively thin, so that the resin outflow from the heat-seal following layer can also be prevented.

In the following, each of the components will be described.

(Base Layer)

Figure 2:
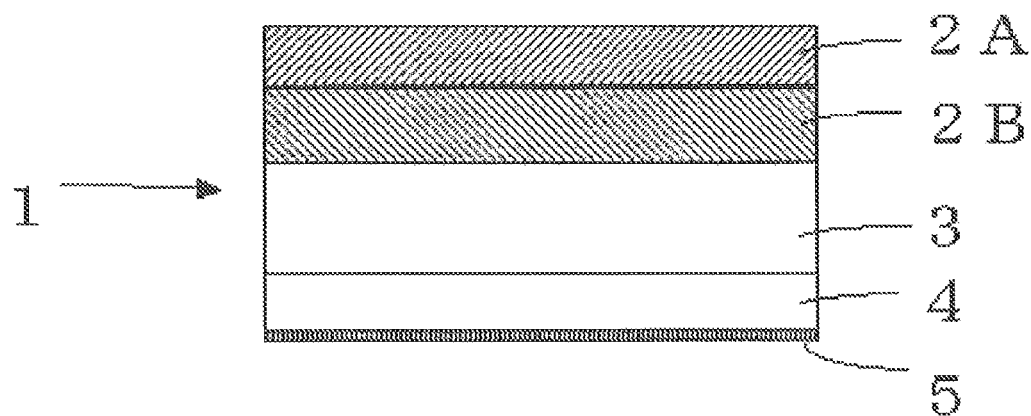
FIG. 2 is a schematic cross-section showing an example of a cover tape for packaging electronic components having a base layer consisting of two layers.

As the base layer used for the cover tape for packaging electronic components in accordance with the present disclosure, films formed by processing various materials suitable for intended use may be used, provided that the film has sufficient mechanical strength to withstand external force applied when the tape is processed or when it heat-sealed to the carrier tape and that the film has heat-resistance sufficient to withstand the heat during heat-sealing. Specific examples of materials for the base layer film includes polyethylene terephthalate, polybutylene terephthalate, polyethylene naphthalate, nylon 6, nylon 66, polypropylene, polymethylpentene, polyvinyl chloride, polyacrylate, polymethacrylate, polyimide, polyether imide, polyarylate, polysulphone, polyether sulphone, polyphenylene ether, polycarbonate and ABS resin. In order to enhance mechanical strength, polyethylene terephthalate, nylon 6 and nylon 66 are preferred. As the base layer, a laminated body containing two or more layers formed of materials for the base layer film mentioned above may be used. FIG. 2 is a schematic cross-section showing an example of the cover tape having the base layer consisting of two layers.

Though an unstretched film may be used for the base layer, use of a uni-axially or biaxially oriented film is preferred in order to enhance mechanical strength of the cover tape as a whole. The thickness of the base layer is preferably 12 to 30 μm, more preferably 16 to 28 μm, and most preferably, 20 to 25 μm. If the thickness of the base layer is smaller than the upper limit of the range mentioned above, rigidity of the cover tape will not be too high and, therefore, even when torsion stress is applied to the carrier tape after heat-sealing, the cover tape well follows the deformation of the carrier tape, and peeling is not likely. Further, if the thickness is larger than the lower limit of the range mentioned above, the cover tape comes to have suitable mechanical strength and, as a result, the problem of cover tape rapture when it is peeled off at high speed for taking out the accommodated electronic components can be prevented.

(Cushion Layer)

The cushion layer used for the cover tape for packaging electronic components in accordance with the present disclosure achieves the cushioning function, as a flexible resin is used. Thus, when the cover tape is heat-sealed to the carrier tape, the pressure and heat from a heat-sealing bar are uniformly transmitted to the heat-seal following layer, the heat-sealing layer and the carrier tape, and therefore, it serves to enhance adhesion between the cover tape and the carrier tape.

A film formed of resin A is preferably used for the cushion layer. Though the resin is not specifically limited and any resin may be used as resin A if it has Vicat softening temperature Ta measured in accordance with ISO 306 satisfying the Relational Expression 1, a resin of which Vicat softening temperature Ta is not lower than 96° C. and not higher than 115° C. is preferred. If Vicat softening temperature is not lower than the lower limit of this range, the outflow of the cushion layer can be prevented at the time of heat-sealing, so that the contamination of the heat-sealing bar as the flown out resin adheres thereon or the decrease in mechanical strength of the cover tape itself caused by deformation of an intermediate layer can be prevented. Further, if the temperature is not higher than the upper limit of this range, sufficient cushioning characteristic can be attained, whereby the pressure and heat at the time of heat-sealing can uniformly be transferred, adhesion between the cover tape and the carrier tape can be improved and sufficient peeling strength can be attained.

Preferably, the resin A described above has flexural modulus measured in accordance with ISO 178 of not lower than 70 MPa and not higher than 250 MPa. If the flexural modulus is not lower than the lower limit of this range, the resin outflow during heat-sealing can more effectively be prevented. Further, if it is not higher than the upper limit of this range, sufficient cushioning characteristic can be attained, whereby the pressure and heat at the time of heat-sealing can uniformly be transferred, adhesion between the cover tape and the carrier tape can be improved and sufficient peeling strength can be attained.

The thickness of cushion layer of the cover tape for packaging electronic components in accordance with the present invention is preferably 15 to 35 μm, more preferably 15 to 30 μm, and most preferably 15 to 25 μm. If the thickness of cushion layer is 15 μm or thicker, sufficient cushioning characteristic can be attained, and adhesion between the cover tape and the carrier tape can be improved. If it is 35 μm or thinner, the heat from the heat-sealing bar can sufficiently be transferred to the heat-seal following layer and to the surface of the carrier tape, and in this case also, adhesion between the cover tape and the carrier tape can be improved. Further, the thickness of cushion layer of not larger than 25 μm is more preferable, since stable heat-sealing characteristic can be maintained even if the heat-sealing temperature should decrease.

Various types of resin may suitably be used as the resin A provided that the conditions described above are satisfied and the resin attains sufficient adhesion to the neighboring layer. Specific examples include polyester, low density polyethylene (LDPE), linear low density polyethylene (LLDPE), ethylene vinyl acetate copolymer, ethylene acrylic acid copolymer, ethylene acrylic acid ester copolymer, ethylene methylmethacrylate copolymer (EMMA), ionomer, ethylene propylene rubber, polypropylene, styrene-based elastomer, hydrogenated styrene-based elastomer and high impact polystyrene (HIPS), and a resin composition having a mixture of two or more resins selected from above may also be available. In order to attain stable mechanical strength of cover tape and stable cushioning characteristic during heat-sealing, use of linear low density polyethylene, hydrogenated styrene-based elastomer such as styrene-ethylene-butylene-styrene block copolymer (SEES) and styrene-ethylene-propylene—styrene block copolymer (SEPS), ethylene vinyl acetate copolymer, or a resin composition having a mixture of two or more selected from the group is preferred. Particularly, use of linear low density polyethylene (LLDPE) polymerized with Metallocene type catalyst is more preferred, since it can significantly reduce tape rupture during working.

Further, by using a resin of which molecular weight distribution represented by mass average molecular weight/number average molecular weight is not larger than 5 as the resin A for the cushion layer, stable heat-sealing characteristic can be attained. The reason for this is that Vicat softening temperature becomes more stable in a resin having smaller molecular weight distribution. When a resin having molecular weight distribution of 3 or smaller such as linear low density polyethylene polymerized with Metallocene type catalyst is used, heat-sealing characteristic becomes more stable. As to the molecular weight distribution (Mw/Mn), a column using styrene divinylbenzene copolymer as a filler base and a solvent (1,2,4-trichlorobenzene) were subjected to gel permeation chromatography at 140° C., and standard polystyrene equivalent values of resulting Mw (weight averaged molecular weight) and Mn (number averaged molecular weight) were calculated, from which Mw/Mn was derived.

Specifically available resin satisfying the above-described requirements and that can be suitably used as the cushion layer includes Evolue (trademark) SP1540 (having flexural modulus of 190 MPa, Vicat softening temperature of 96° C. and molecular weight distribution of 2.5) and SP2120 (having flexural modulus of 240 MPa, Vicat softening temperature of 104° C. and molecular weight distribution of 2.5), manufactured by Prime Polymer Co. Ltd.

When a resin composition containing a mixture of two or more resins is used as the resin A described above, it is preferred that the resin composition as a whole satisfies the physical characteristics described above.

(Heat-Seal Following Layer)

The heat-seal following layer of the cover tape for packaging electronic components in accordance with the present disclosure serves to have the heat-sealing layer follow any deformation on the surface of carrier tape, when the surface should be warped, made rough or otherwise deformed and is not flat, at the time of heat-sealing, thereby to improve adhesion to the carrier tape.

Since the carrier tape used is formed of plastic or paper, it is difficult to prevent such deformation as mentioned above. On the other hand, the heat-sealing bar is formed of metal and hence it does not deform at the heat-sealing temperature of about 180° C. to about 220° C., so that the cover tape attached along the heat-sealing portion of the bar is kept flat. Therefore, without the heat-seal following layer, small space would be generated between the cover tape and the carrier tape at the time of heat-sealing, hindering sufficient adhesion, and the peeling strength between the cover tape and the carrier tape would be significantly reduced. Further, it is possible to mix a filler such as silica or cross-linked beads with the heat-seal following layer, whereby blocking of cover tapes with each other at the time of delivery can be prevented. A filler having grain diameter of about 1 μm to about 10 μm is preferred in view of processability.

The heat-seal following layer of cover tape for packaging electronic components in accordance with the present invention may be provided next to the heat-sealing layer, or one or more resin layers may be provided between the heat-seal following layer and the cushion layer to improve adhesion characteristic between these layers.

For the heat-seal following layer of cover tape for packaging electronic components in accordance with the present disclosure, the resin B is used, which has Vicat softening temperature lower than that of the resin A described above. Here, Vicat softening temperature Tb of the resin B satisfies Relational Expression 1 of $Ta-Tb \geqq 3°$ C. In order to attain more stable heat-sealing characteristic, use of a resin that satisfies Relational Expression 2 of $Ta-Tb \geqq 10°$ C. is preferred. If the Relational Expression 1 above is satisfied, it is possible to prevent outflow of the cushion layer from a tape end caused by softening before the cover tape is adhered to the carrier tape, and thereby to prevent contamination of the heat-sealing bar.

As the resin B used for the heat-seal following layer of the cover tape for packaging electronic components in accordance with the present disclosure, one having Vicat softening temperature. Tb measured in accordance with ISO 306 of not lower than 75° C. and not higher than 93° C. is preferred. If Vicat softening temperature. Tb is not lower than the lower limit of this range, increase of adhesion characteristic between the heat-sealed cover tape and the carrier tape can be prevented even in a high-temperature environment during delivery or storage, and stable peeling strength is ensured. If. Vicat softening temperature. Tb is not higher than the upper limit of this range, the heat-seal following layer and the heat-sealing layer sufficiently follow deformation such as warp and roughness of the carrier tape surface, enabling improved adhesion characteristic between the carrier tape and the cover tape.

For the heat-seal following layer of the cover tape for packaging electronic components in accordance with the present disclosure, the resin B having flexural modulus measured in accordance with ISO 178 of not lower than 70 MPa and not higher than 250 MPa is preferably used. If the flexural modulus of the resin B used for the heat-seal following layer is not lower than the lower limit of this range, the resin outflow at the time of heat-sealing can more easily be prevented. If it is not higher than the upper limit of this range, sufficient cushioning characteristic can be attained, so that pressure and heat can be uniformly transferred during heat-sealing, adhesion between the cover tape and the carrier tape is improved and sufficient peeling strength can be attained.

Thickness of the heat-seal following layer of the cover tape for packaging electronic components in accordance with the present disclosure is set to be not smaller than 2 μm and not larger than 15 μm. If it is 2 μm or thicker, it is possible to have the heat-sealing layer sufficiently follow the surface deformation of the carrier tape, and if it is 15 μm or thinner, it is possible to prevent the outflow of the heat-seal following layer and to prevent contamination of the heat-sealing bar. Considering productivity and ease in management, preferable thickness is at least 3 μm to at most 10 μm.

Various types of resin may suitably be used as resin B provided that the conditions described above are satisfied and the resin attains sufficient adhesion to the neighboring layer. Specific examples include: α-olefin copolymer such as polyester, low density polyethylene (LDPE) and linear low density polyethylene (LLDPE); ethylene vinyl acetate copolymer (EVA), ethylene acrylic acid copolymer, ethylene methylmethacrylate copolymer (EMMA), ethylene acrylic acid ester copolymer, ionomer, ethylene propylene rubber, polypropylene, styrene-based elastomer, hydrogenated styrene-based elastomer and polystyrene (PS). Also, a resin composition having a mixture of two or more of these resins may be used. In order to attain stable mechanical strength of the cover tape and stable cushioning characteristic during heat-sealing, use of linear low density polyethylene (LLDPE), hydrogenated styrene-based elastomer such as styrene-ethylene-butylene-styrene block copolymer (SEBS) and styrene-ethylene-propylene-styrene block copolymer (SEPS), ethylene vinyl acetate copolymer (EVA), or a resin composition having a mixture of two or more selected from the group is preferred. Particularly, use of linear low density polyethylene polymerized with Metallocene type catalyst is more preferred, since it can significantly reduce the tape rupture during working. Specifically available resin satisfying the above-described requirements includes. Evolue (trademark) SP1020 (having flexural modulus of 140 MPa, Vicat softening temperature of 92° C. and molecular weight distribution of 2.5) manufactured by Prime Polymer Co. Ltd., and Evolue (trademark) SP0540 (having flexural modulus of 120 MPa, Vicat softening temperature of 83° C. and molecular weight distribution of 2.5) manufactured by Prime Polymer Co. Ltd.

As in the case of the resin A, by using a resin of which molecular weight distribution represented by weight average molecular weight/number average molecular weight not higher than 5 as the resin B, softening point of the heat-seal following layer becomes stable, and stable heat-sealing characteristic can be attained. Further stabilization can be attained when a resin of which molecular weight distribution is not higher than 3 is used.

When a resin composition having a mixture of two or more resins is used as the resin B described above, it is preferred that the resin composition as a whole satisfies the physical characteristics described above.

Though resins of different types may be used for the cushion layer and the heat-seal following layer, if the cushion layer and the heat-seal following layer are provided next to each other, use of ethylene α-olefin copolymer in both layers is preferred, since adhesion between the cushion layer and the heat-seal following layer can be improved while stability of heat-sealing is maintained.

Specific examples of the resin A/resin B combination are as follows: LLDPE/LLDPE; LLDPE/EVA; LLDPE/SEBS; EVA/EVA; EVA/LLDPE; EVA/SEBS; SEBS/LLDPE; SEBS/SEBS; LLDPE/EMMA; EVA/EMMA; SEBS/EMMA; LLDPE/composite material of LLDPE and EMMA; LLDPE/composite material of PS and SEBS; LLDPE/composite material of LDPE, EMMA and SEBS; LDPE/composite material of LDPE and EMMA; and LDPE/composite material of LDPE, EMMA and SEBS.

Of these combinations, LLDPE/LLDPE, LLDPE/EVA, LLDPE/SEBS, EVA/EVA, EVA/LLDPE, EVA/SEBS, SEBS/LLDPE, and SEBS/SEBS are preferred from the viewpoint of tape processability and mechanical strength of the tape itself. Among these, the combination of LLDPE/LLDPE is most preferable, as it provides stable heat-sealing characteristic. Selection of LLDPE having different density (specific gravity) is a possible method to vary Vicat softening point of LLDPE.

(Heat-Sealing Layer)

The heat-sealing layer for the cover tape for packaging electronic components in accordance with the present disclosure has a function of fusion boding to the carrier tape when heated. For the heat-sealing layer, a resin that can be thermally fused and bonded to the carrier tape is used. Examples are: ionomer resin; polyester resin; vinyl chloride-vinyl acetate copolymer; acrylic resin; acrylic type resin; polyurethane resin; ethylene vinyl acetate copolymer; ethylene-(meth)acrylic acid copolymer; and maleic acid resin. Acrylic type resin is suitably used, as it can be thermally fused and bonded to various and many carrier tapes. Further, in order to add antistatic effect, an electrically conductive filler such as metal oxide or a high-molecular copolymer type antistatic agent may be added to the heat-sealing layer. Further, an additive such as a dispersant, filler or a plasticizer may be added as needed.

(Method for Producing Cover Tape)

The base layer of the cover tape for packaging electronic components in accordance with the present invention may be formed by a single layer of biaxially-oriented film obtained through extrusion, or by a layered film formed by laminating such biaxially-oriented films. The cushion layer and the heat-seal following layer may be formed by laminating the resin A and the resin B through coextrusion, inflation, dry lamination or the like.

The heat-sealing layer may be formed by preparing a coating liquid by dissolving or dispersing a resin that can be thermally fused and bonded to the carrier tape appropriately in a solvent, applying the coating liquid to the surface of heat-seal following layer by a known coating method of roll-coating or gravure coating and drying the same.

Each of the layers of the cover tape for packaging electronic components described above may be laminated using an adhesive, as needed. The method of laminating is not specifically limited, and one example is dry laminate method using thermosetting polyurethane adhesive. That surface of the heat-seal following layer which is to be adhered to the heat-sealing layer may be subjected to an adhesion enhancing process utilizing, for example, corona discharge.

From the viewpoint of improved rupture strength of the tape as a whole, a laminated tape including a two-layered base layer laminated with an adhesive layer therebetween, and the cushion layer, the heat-seal following layer and the heat-sealing layer stacked in this order on the base layer as shown in FIG. 2 is preferably used as the cover tape for packaging electronic components.

(Electronic Component Packing Body)

Figure 3:
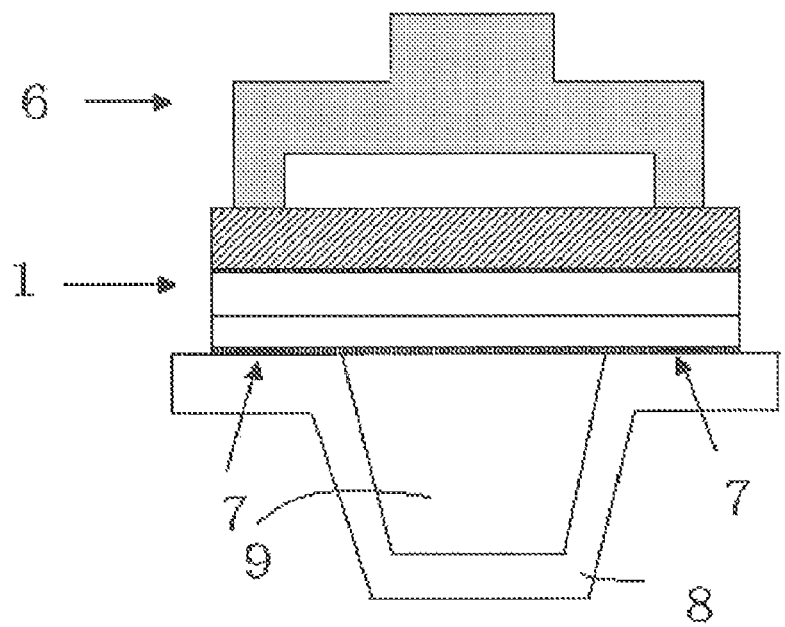
FIG. 3 is a schematic cross-section showing an exemplary state during heat-sealing between the carrier tape and the cover tape for packaging electronic components in accordance with the present disclosure.
Figure 4:
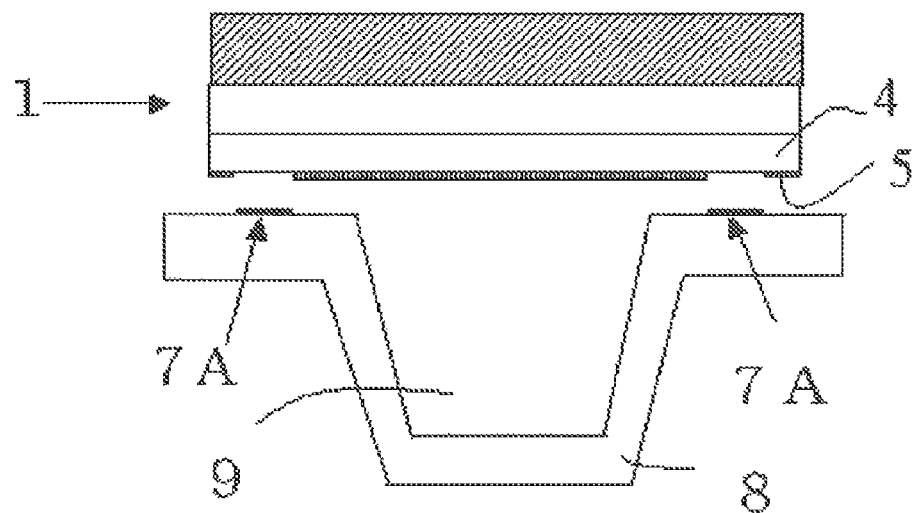
FIG. 4 is a schematic cross-section showing an exemplary state after the cover tape for packaging electronic components in accordance with the present disclosure is peeled off from the carrier tape.
Figure 5:
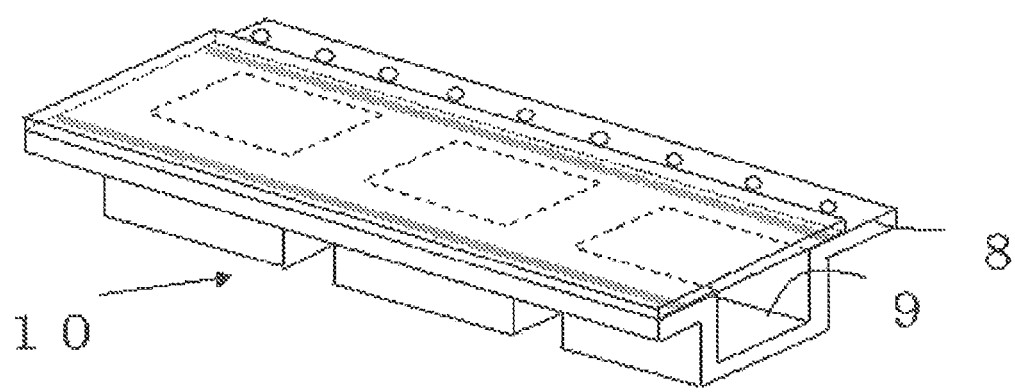
FIG. 5 is a perspective view showing an example of electronic component packing body provided by heat-sealing the cover tape for packaging electronic components in accordance with the present disclosure.

The electronic component packing body in accordance with the present disclosure can be obtained by heat-sealing the carrier tape and the cover tape for packaging electronic components in accordance with the present disclosure. FIG. 3 is a schematic cross-section showing an exemplary state during heat-sealing between the carrier tape and the cover tape for packaging electronic components in accordance with the present disclosure, and FIG. 5 is a perspective view showing an example of electronic component packing body in which the cover tape for packaging electronic components in accordance with the present disclosure is heat-sealed to the carrier tape. Further, in the electronic component packing body described above, preferably, when the heat-sealed cover tape is peeled off from the carrier tape, heat-sealed portions between heat-seal following layer 4 and heat-sealing layer 5 peel off and part of the heat-sealing layer is transferred to carrier tape 8, as shown in FIG. 4. Such an approach makes the peeling strength less susceptible to the influence of surface state of the heat-sealing surface or the resin type of carrier tape. As a result, the heat-sealing to carrier tapes of various and many materials becomes possible, which leads to improved stability of production. The electronic component packing body having such a peeling structure is obtained by designing such that heat-sealing strength between the surface of carrier tape and the heat-sealing layer is made higher than inter-layer strength between the heat-sealing layer and the heat-seal following layer, considering the heat-sealing temperature. The electronic component packing body described above preferably has the peeling strength of not lower than 0.2 N and not higher than 1.0 N. If the strength is not lower than the lower limit, peeling of the cover tape during delivery of electronic components can be prevented. If the strength is not higher than the upper limit, good peeling characteristic of the cover tape when the electronic component is taken out from the electronic component packing body can be maintained, whereby the process step of mounting electronic components can be executed stably.

EXAMPLES

In the following, the present invention disclosure will be described in detail with reference to specific examples. Raw materials used for the examples and comparative examples and their properties areas follows. Table 1 shows characteristics of resins used for the cushion layer and the heat-seal following layer.

(1) Base Layer

Biaxially oriented polyethylene terephthalate: Ester film T6140 manufactured by Toyobo Co. Ltd.

Biaxially oriented 6-nylon: Bonyl W (Trademark) manufactured by Kohjin Co. Ltd.

(2) Cushion Layer

Metallocene LLDPE 1: Evolue (trademark) SP1510 (Vicat softening temperature: 98° C., flexural modulus: 240 MPa, molecular weight distribution: 4.5), manufactured by Prime Polymer Co., Ltd.

Metallocene LLDPE 2: Evolue (trademark) SP212 (Vicat softening temperature: 104° C., flexural modulus: 240 MPa, molecular weight distribution: 2.5), manufactured by Prime Polymer Co., Ltd.

Metallocene LLDPE 3: Evolue (trademark) SP1540 (Vicat softening temperature: 96° C., flexural modulus: 190 MPa, molecular weight distribution: 2.5), manufactured by Prime Polymer Co., Ltd.

(3) Heat-Seal Following Layer

Metallocene LLDPE 4: Evolue (trademark) SP0511 (Vicat softening temperature: 84° C., flexural modulus: 130 MPa, molecular weight distribution: 4.5), manufactured by Prime Polymer Co., Ltd.

Metallocene LLDPE 5: Evolue (trademark) SP0540 (Vicat softening temperature: 83° C., flexural modulus: 120 MPa, molecular weight distribution: 2.5), manufactured by Prime Polymer Co., Ltd.

Metallocene LLDPE 6: Evolue (trademark) SP1020 (Vicat softening temperature: 92° C., flexural modulus: 140 MPa, molecular weight distribution: 2.5), manufactured by Prime Polymer Co., Ltd.

(4) Heat-Sealing Layer

Acrylic type adhesive resin: A450A manufactured by DIC Corporation.

(Method for Manufacturing Samples)

As examples, samples of cover tape for packaging electronic components were formed by the following method to have layered structures as listed in Tables 2 and 3. As comparative examples, samples of cover tape for packaging electronic components were formed by the similar method to have layered structures as listed in Table 4.

For samples having two-layered base layer, base layer 1 and base layer 2 were laminated by dry lamination method using a two-liquid thermosetting type polyurethane adhesive.

The cushion layer and the heat-seal following layer were formed by lamination through melt co-extrusion.

A cushion-layer-side surface of the film formed by laminating the cushion layer and the heat-seal following layer and the base layer were laminated by dry lamination using a two-liquid thermosetting type polyurethane adhesive.

A surface of the heat-seal following layer of the thus laminated film was subjected to corona discharge to ease adhesion, and to this adhesion-facilitated surface, coating liquid for the heat-sealing layer was applied by direct gravure method and dried, and thus, samples of the cover tape were formed.

(Test 1 of Heat-Sealing to Carrier Tape)

The cover tape obtained by the forming method described above was heat-sealed under the following heat-sealing conditions 1 to a carrier tape formed of conductive polystyrene having the width of 8 mm, as Heat-Sealing Test 1.

Heat-Sealing Conditions 1

Heat-sealing temperature: 150° C.

Heat-sealing bar pressing time: 0.1 sec/time

Number of pressing heat-sealing bar: 4 times
Load of pressing heat-sealing bar: 1.5 kgf
Width of heat-sealing: 0.5 mm×2 lines
(Test 2 of Heat-Sealing to Carrier Tape)
The cover tape obtained by the forming method described above was heat-sealed under the following heat-sealing conditions 2 to a carrier tape formed of conductive polycarbonate having the width of 8 mm, as Heat-Sealing Test 2.
Heat-Sealing Conditions 2
Heat-sealing temperature: 180° C.
Heat-sealing bar pressing time: 0.1 sec/time
Number of pressing heat-sealing bar: 4 times
Load of pressing heat-sealing bar: 1.5 kgf
Width of heat-sealing: 0.5 mm×2 lines
(Evaluation Items and Evaluation Standards)
Samples obtained under heat-sealing conditions 1 and 2 described above were evaluated on the following items.
Peeling strength: The cover tape was peeled off from the heat-sealed samples at 165° to 180° in accordance with JIS C-0806-3, and one that exhibited average strength of not lower than 0.2 N and lower than 1.0 N was regarded acceptable.
⊚: not lower than 0.3 N and not higher than 0.5 N
○: not lower than 0.25 N and not higher than 0.3 N, or higher than 0.5 N and not higher than 0.7 N
Δ: not lower than 0.2 N and lower than 0.25 N, or higher than 0.7 N and lower than 1.0 N
x: lower than 0.2 N or not lower than 1.0 N.
Peeling range: During measurement of peeling strength, a sample, of which difference between maximum and minimum values was not larger than 0.3 N, was regarded acceptable.
⊚: smaller than 0.15 N
○: not smaller than 0.15 N and not larger than 0.3 N
x: larger than 0.3 N Bar contamination: During manufacturing of samples in accordance with heat-sealing conditions 1 and 2, portions of which sealing position is inner by 0.1 mm than each edge of the cover tape were sealed continuously for more than 15 minutes, and state of contamination of the bar caused by the outflow of the cushion layer was visually observed.

⊚: free of contamination

○: almost free of contamination

Δ: slight contamination, no influence on sealing x: contamination influencing sealing xx: heavy contamination

TABLE 1

| | Vicat softening point ° C. | Flexural modulus Mpa | Molecular weight distribution |
|---|---|---|---|
| Metallocene LLDPE 1 | 98 | 240 | 4.5 |
| Metallocene LLDPE 2 | 104 | 240 | 2.5 |
| Metallocene LLDPE 3 | 96 | 190 | 2.5 |
| Metallocene LLDPE 4 | 84 | 130 | 4.5 |
| Metallocene LLDPE 5 | 83 | 120 | 2.5 |
| Metallocene LLDPE 6 | 92 | 140 | 2.5 |

TABLE 2

| Composition | | Example 1 | Example 2 | Example 3 |
|---|---|---|---|---|
| Base layer 1 | Material | Biaxially oriented PET | Biaxially oriented PET | Biaxially oriented PET |
| | Thickness (μm) | (12) | (12) | (12) |
| Base layer 2 | Material | Biaxially oriented 6 nylon | Biaxially oriented 6 nylon | Biaxially oriented 6 nylon |
| | Thickness (μm) | (12) | (12) | (12) |
| Cushion layer | Material | Metallocene LLDPE 1 | Metallocene LLDPE 3 | Metallocene LLDPE 3 |
| | Thickness (μm) | (20) | (20) | (15) |
| Heat-seal following layer | Material | Metallocene LLDPE 4 | Metallocene LLDPE 5 | Metallocene LLDPE 5 |
| | Thickness (μm) | (5) | (5) | (10) |
| Heat-sealing layer | Material | Acrylic resin | Acrylic resin | Acrylic resin |
| | Thickness (μm) | (0.5) | (0.5) | (0.5) |
| Ta-Tb | ° C. | 14 | 13 | 13 |
| Heat-sealing conditions 1 | Peeling strength | ⊚ | ⊚ | ⊚ |
| | Peeling range | ○ | ⊚ | ⊚ |
| | Bar contamination | ⊚ | ⊚ | ○ |
| Heat-sealing conditions 2 | Peeling strength | ○ | ○ | ○ |
| | Peeling range | ⊚ | ⊚ | ⊚ |
| | Bar contamination | ⊚ | ⊚ | ○ |

TABLE 3

| Composition | | Example 4 | Example 5 | Example 6 |
|---|---|---|---|---|
| Base layer 1 | Material | Biaxially oriented PET | Biaxially oriented PET | Biaxially oriented PET |
| | Thickness (μm) | (25) | (25) | (25) |
| Base layer 2 | Material | — | — | — |
| | Thickness (μm) | — | — | — |
| Cushion layer | Material | Metallocene LLDPE 2 | Metallocene LLDPE 2 | Metallocene LLDPE 3 |
| | Thickness (μm) | (20) | (15) | (15) |

TABLE 3-continued

| Composition | | Example 4 | Example 5 | Example 6 |
|---|---|---|---|---|
| Heat-seal following layer | Material | Metallocene LLDPE 6 P11 (5) | Metallocene LLDPE 6 (10) | Metallocene LLDPE 6 (10) |
| | Thickness (μm) | | | |
| Heat-sealing layer | Material | Acrylic resin | Acrylic resin | Acrylic resin |
| | Thickness (μm) | (0.5) | (0.5) | (0.5) |
| Ta-Tb | °C. | 12 | 12 | 4 |
| Heat-sealing conditions 1 | Peeling strength | ∆ | ∆ | ∆ |
| | Peeling range | ○ | ○ | ⊚ |
| | Bar contamination | ⊚ | ⊚ | ○ |
| Heat-sealing conditions 2 | Peeling strength | ⊚ | ⊚ | ⊚ |
| | Peeling range | ⊚ | ⊚ | ⊚ |
| | Bar contamination | ⊚ | ○ | ∆ |

TABLE 4

| Composition | | Comparative Example 1 | Comparative Example 2 | Comparative Example 3 |
|---|---|---|---|---|
| Base layer 1 | Material | Biaxially oriented PET | Biaxially oriented PET | Biaxially oriented PET |
| | Thickness (μm) | (25) | (25) | (25) |
| Base layer 2 | Material | — | — | — |
| | Thickness (μm) | | | |
| Cushion layer | Material | — | Metallocene LLDPE 3 | Metallocene LLDPE 2 |
| | Thickness (μm) | | (5) | (25) |
| Heat-seal following layer | Material | Metallocene LLDPE 5 | Metallocene LLDPE 5 | — |
| | Thickness (μm) | (25) | (20) | |
| Heat-sealing layer | Material | Acrylic resin | Acrylic resin | Acrylic resin |
| | Thickness (μm) | (0.5) | (0.5) | (0.5) |
| Ta-Tb | °C. | — | 13 | — |
| Heat-sealing conditions 1 | Peeling strength | ⊚ | ⊚ | X |
| | Peeling range | ⊚ | ⊚ | ○ |
| | Bar contamination | X | X | ⊚ |
| Heat-sealing conditions 2 | Peeling strength | ○ | ○ | ∆ |
| | Peeling range | ⊚ | ○ | X |
| | Bar contamination | XX | XX | ⊚ |

From the results shown in the tables, it is clear that the electronic component packing bodies obtained as examples exhibited stable peeling strength. Further, the outflow of resin was hardly observed during heat-sealing of the electronic component packing bodies obtained in examples, and it can be seen that the contamination of sealing bar was also reduced.

INDUSTRIAL APPLICABILITY

Using the cover tape for packaging electronic components obtained by the present disclosure, contamination of the heat-sealing bar can be prevented when the cover tape is heat-sealed to the carrier tape, and stable heat-sealing strength can be attained. Therefore, it is suitable as a cover tape for a carrier tape used for delivery and storage of electronic components.

DESCRIPTION OF REFERENCE CHARACTERS

1 cover tape for packaging electronic components
2 base layer
2A, 2B base layers when 2-layered structure is used
3 cushion layer
4 heat-seal following layer
5 heat-sealing layer
6 heat-sealing bar
7 heat-sealed portion
7A peeled and transferred portion of heat-sealing layer
8 carrier tape
9 embossed portion
10 electronic component packing body

The invention claimed is:

1. A cover tape for packaging electronic components heat-sealable to a carrier tape for packaging electronic components, comprising
at least a base layer, a cushion layer formed of resin A, following layer formed of resin B which is positioned directly next to a heat sealing layer and the heat-sealing layer laminated in this order; wherein
Vicat softening temperature Ta of said resin A measured in accordance with ISO 306 (rate of temperature increase: 50° C./hour, load: 10N) and Vicat softening temperature Tb of said resin B measured in accordance with ISO 306 (rate of temperature increase:50° C./hour, load: 10N) satisfy the Relational Expression 1 below;
said resin B comprises a linear low density polyethylene; and
thickness of said following layer is not smaller than 2 μm and not larger than 15 μm:

$Ta-Tb \geq 3 (° C.)$.                    Relational Expression 1

2. The cover tape for packaging electronic components according to claim 1, wherein
Vicat softening temperature Ta and Vicat softening temperature Tb satisfy the Relational Expression 2 below:

$Ta-Tb \geq 10 (° C.)$.                   Relational Expression 2

3. The cover tape for packaging electronic components according to claim 1 or 2, wherein
Vicat softening temperature Ta is not lower than 96° C. and not higher than 115° C.

4. The cover tape for packaging electronic components according to claim 3, wherein Vicat softening temperature Tb is not lower than 75° C. and not higher than 93° C.

5. The cover tape for packaging electronic components according to claim 3, wherein
the resin A is a linear low density polyethylene, a hydrogenated styrene-based elastomer, an ethylene vinyl acetate copolymer, or a resin composition containing a mixture of two or more selected from this group.

6. The cover tape for packaging electronic components according to claim 1 or 2, wherein
Vicat softening temperature Tb is not lower than 75° C. and not higher than 93° C.

7. The cover tape for packaging electronic components according to claim 6, wherein
the resin A is a linear low density polyethylene, a hydrogenated styrene-based elastomer, an ethylene vinyl acetate copolymer, or a resin composition containing a mixture of two or more selected from this group.

8. The cover tape for packaging electronic components according to claim 1 or 2, wherein
the resin A is a linear low density polyethylene, a hydrogenated styrene-based elastomer, an ethylene vinyl acetate copolymer, or a resin composition containing a mixture of two or more selected from this group.

9. The cover tape for packaging electronic components according to claim 1 or 2, wherein
the flexural modulus of each of the resin A and the resin B measured in accordance with ISO 178 is not lower than 70 MPa and not higher than 250 MPa.

10. The cover tape for packaging electronic components according to claim 1 or 2, wherein
a thickness of the cushion layer is not smaller than 15 μm and not larger than 35 μm.

11. The cover tape for packaging electronic components according to claim 1 or 2, wherein
the following layer is positioned next to the cushion layer.

12. The cover tape for packaging electronic components according to claim 11, wherein
both the resin A and the resin B comprise an ethylene α-olefin copolymer.

13. The cover tape for packaging electronic components according to claim 1 or 2, wherein
the molecular weight distribution represented by weight average molecular weight/number average molecular weight of each of the resin A and the resin B is not higher than 5.

14. An electronic component packing body obtained by heat-sealing the cover tape for packaging electronic components according to claim 1 or 2 to a carrier tape for packaging electronic components.

15. The electronic component packing body according to claim 14, wherein
peeling occurs between the heat-sealing layer and the following layer at a heat-sealed region, when the cover tape is peeled off from the carrier tape.

* * * * *